(12) United States Patent
Bloyer et al.

(10) Patent No.: US 6,977,477 B2
(45) Date of Patent: Dec. 20, 2005

(54) SYSTEMS, APPARATUS, AND METHODS FOR MOTOR CONTROL

(75) Inventors: Donald Ray Bloyer, Eden Prairie, MN (US); Garry E. Korbel, New Prague, MN (US); Matthew E. Hastings, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 294 days.

(21) Appl. No.: 09/995,433

(22) Filed: Nov. 27, 2001

(65) Prior Publication Data

US 2002/0063545 A1    May 30, 2002

Related U.S. Application Data

(60) Provisional application No. 60/253,217, filed on Nov. 27, 2000.

(51) Int. Cl.[7] .......................... G05B 11/01; G05F 1/10; G11B 5/58
(52) U.S. Cl. ...................... 318/560; 318/565; 318/638; 360/75; 360/77.04; 369/53.12; 369/53.13; 369/53.14; 369/53.15; 369/53.18; 369/53.42; 369/30.22; 369/44.32; 369/47.44; 388/806; 388/815; 388/823; 388/902
(58) Field of Search .................. 318/560, 638, 318/685, 696, 565; 388/806, 815, 833, 847; 369/30.22, 30.24, 30.36, 44.32, 44.33, 44.34, 369/47.44, 52.1

(56) References Cited

U.S. PATENT DOCUMENTS

| | | | |
|---|---|---|---|
| 4,491,776 A * | 1/1985 | Veale | 318/561 |
| 4,845,418 A | 7/1989 | Conner | 318/778 |
| 5,317,243 A | 5/1994 | Cameron | 318/254 |
| 5,426,545 A * | 6/1995 | Sidman et al. | 360/78.09 |
| 5,473,230 A * | 12/1995 | Dunn et al. | 318/432 |
| 5,530,326 A * | 6/1996 | Galvin et al. | 318/254 |
| 5,768,226 A * | 6/1998 | Ogino | 369/44.28 |
| 5,774,285 A * | 6/1998 | Kassab et al. | 360/31 |
| 5,970,033 A * | 10/1999 | Nakano et al. | 369/44.29 |
| 6,144,179 A | 11/2000 | Kessler et al. | 318/565 |
| 6,157,599 A * | 12/2000 | Yamashita et al. | 369/44.28 |
| 6,195,321 B1 * | 2/2001 | Takamine et al. | 369/47.44 |
| 6,229,274 B1 | 5/2001 | Vertemara et al. | 318/430 |
| 6,249,495 B1 * | 6/2001 | Okada et al. | 369/44.28 |
| 6,282,046 B1 * | 8/2001 | Houston et al. | 360/73.03 |
| 6,392,833 B1 * | 5/2002 | Wood et al. | 360/73.03 |
| 6,401,214 B1 * | 6/2002 | Li | 714/6 |
| 6,429,997 B1 * | 8/2002 | Oida | 360/78.07 |
| 6,493,173 B1 * | 12/2002 | Kim et al. | 360/77.04 |
| 6,574,754 B1 * | 6/2003 | Smith | 714/47 |
| 6,653,809 B2 * | 11/2003 | Nakatani | 318/560 |
| 6,717,763 B2 * | 4/2004 | Ottesen et al. | 360/75 |
| 6,741,414 B1 * | 5/2004 | Boyd et al. | 360/73.03 |
| 6,751,046 B1 * | 6/2004 | Szita et al. | 360/77.04 |

(Continued)

Primary Examiner—David Martin
Assistant Examiner—Patrick Miller
(74) Attorney, Agent, or Firm—David K. Lucente; Derek J. Berger

(57) ABSTRACT

Systems and methods are provided through which the current to a spindle motor of the recording medium of a mass storage device is modulated to avoid anomalies in the operation of mass storage device and reduce power consumption. In the example of a disc drive, the current is modulated to prevent expected or predicted disturbances in the air bearing between a read/write head and the recording medium, and to reduce the power consumption when no disturbances are predicted or expected.

23 Claims, 13 Drawing Sheets

U.S. PATENT DOCUMENTS

| | | | |
|---|---|---|---|
| 6,850,385 B1 * | 2/2005 | Woods | 360/77.04 |
| 6,894,862 B2 * | 5/2005 | Kusumoto | 360/77.04 |
| 2002/0044370 A1 * | 4/2002 | Min et al. | 360/31 |
| 2002/0060540 A1 * | 5/2002 | Zhang et al. | 318/560 |
| 2003/0117906 A1 * | 6/2003 | Rahman | 369/13.35 |
| 2005/0068661 A1 * | 3/2005 | Byun et al. | 360/75 |

* cited by examiner

SYSTEMS, APPARATUS, AND METHODS FOR MOTOR CONTROL

RELATED APPLICATION

This application claims the benefit of U.S. Provisional Application Ser. No. 60/253,217 filed Nov. 27, 2000 under 35 U.S.C. 119(e).

FIELD OF THE INVENTION

This invention relates generally to a spindle motor of a mass storage device, and more particularly to managing current that controls the rotation speed of the spindle motor of the mass storage device.

BACKGROUND OF THE INVENTION

Conventional mass storage devices include a spindle motor of the mass storage device that applies mechanical energy to rotate the recording medium. Conventional approaches to reducing wear on various parts of the mass storage device during spin-up and spin-down focus on reducing the time to complete spin-up or spin-down. The approaches to reducing the time includes optimization of the application of current to the spindle motor of the mass storage device to uniformly decrease current input throughout the entire spin-up process, and improving the mechanics of the spindle motor of the mass storage device to improve use of available current. Reducing wear by reducing the time to complete spin-up or spin-down incorrectly assumes that wear of the interface is reduced by reducing the linear sliding contact distance of a head and a rotating disc. This assumption is incorrect because impacts from the dynamic response of the head as the head slides across the rotating disc contribute a considerable extent of damage to the head and the disc. The wear is accentuated for a disc having laser textured bumps in a landing zone.

During the initialization, temporary anomalies in the rotation typically occur that increases the wear on various parts of the mass storage device, including a read/write head. The anomalies include the cessation of the air bearing of the read/write head, either during an intermittent bounce off of the disc, or a longer term sliding of the head on the rotating disc.

FIG. 1 is a chart 100 of a relationship between input current and time in a conventional mass storage device during initialization. During initialization, also known as spin-up, of the mass storage device, the spindle motor of the mass storage device receives a substantially linear monotonically decreasing quantity of current 110. The current 110 is linearly decreased from the beginning time of the initialization $t_0$ 120, through various other times, such as $t_1$ 130, $t_2$ 140, and $t_3$ 150, until a target rotation speed is achieved at time $t_4$ 160, after which, a decreased and constant quantity of current 110 is applied to the motor to maintain the target rotation speed.

FIG. 2 is a chart 200 of a relationship between available torque and time in a conventional mass storage device during initialization. In general, the quantity of available torque 210 decreases during spin-up of the disc. The quantity of available torque 210 decreases from the beginning time of the initialization $t_0$ 220, through various other times, such as $t_1$ 230, $t_2$ 240, and $t_3$ 250, until a target rotation speed is achieved at time $t_4$ 260, after which, no torque is available when the quantity of current input to the motor is held constant, as shown in FIG. 1, to maintain the target rotation speed.

In FIG. 2, the available torque 210 is less than maximum between times $t_0$ 220 and $t_1$ 230, while the head is sliding on the rotating disc. When the head flies over the rotating disc on an air bearing, between times $t_1$ 230 and $t_2$ 240, the available torque 210 increases. However, when an anomaly occurs, such as the cessation of the head flying on an air bearing, either during an intermittent bounce off of the disc, or a longer term sliding of the head on the rotating disc, the available torque 210 decreases during that time. For example a decrease in available torque 210 occurs between times $t_2$ 240 and $t_3$ 250 during a cessation of the head flying on an air bearing while the head slides on the rotating disc. Thereafter, when the head resumes flying over the rotating disc on an air bearing, between times $t_3$ 250 and $t_4$ 260, the available torque 210 gradually decreases as the rotation speed increases, as shown in FIG. 3.

FIG. 3 is a chart 300 of a relationship between rotation speed of the disc and time in a conventional mass storage device during initialization. In general, the rotation speed (RPM) 310 rises during spin-up of the disc. The rotation speed 310 increases from the beginning time of the initialization $t_0$ 320, through various other times, such as $t_1$ 330, $t_2$ 340, and $t_3$ 350, until a target rotation speed is achieved at time $t_4$ 360. After the target rotation speed is achieved, the rotation speed 310 is held substantially constant through a constant input of current, as shown in FIG. 1.

In FIG. 3, the rotation speed 310 is less than maximum between times $t_0$ 320 and $t_1$ 330, while the head is sliding on the rotating disc. When the head flies over the rotating disc on an air bearing, between times $t_1$ 330 and $t_2$ 340, the rotation speed 310 increases.

However, when an anomaly occurs, such as the cessation of the head flying on an air bearing, either during an intermittent bounce off of the disc, or a longer term sliding of the head on the rotating disc, the rate of acceleration in the rotation speed 310 slows. The rate of acceleration in the rotation speed 310 slows to no lower than zero, in which the rotation speed 310 holds steady. For example, a decrease in acceleration of rotation speed 310 occurs between times $t_2$ 340 and $t_3$ 350 during a cessation of the head flying on an air bearing while the head slides on the rotating disc.

After time $t_3$ 350, the head resumes flying over the rotating disc on an air bearing. Between times $t_3$ 350 and $t_4$ 360, the rotation speed 410 gradually rises until the target rotation speed is achieved.

FIG. 4 is a chart 400 of a relationship between drag and time in a conventional mass storage device during initialization. In general, drag 410, decreases during spin-up of the disc. The drag 410 generally decreases from the beginning time of the initialization $t_0$ 420, through various other times, such as $t_1$ 430, $t_2$ 440, and $t_3$ 450, until a rotation speed is achieved at time $t_4$ 460. After the target rotation speed is achieved, the drag 410 remains substantially constant through a constant input of current, as shown in FIG. 1.

In FIG. 4, the drag 410 is substantially at maximum between times $t_0$ 420 and $t_1$ 430, while the head is sliding on the rotating disc. When the head flies over the rotating disc on an air bearing, between times $t_1$ 430 and $t_2$ 440, the drag 410 decreases. However, when an anomaly occurs, such as the cessation of the head flying on an air bearing, either during an intermittent bounce off of the disc, or a longer term sliding of the head on the rotating disc, the drag 410 increases during that time. For example an increase in drag 410 occurs between times $t_2$ 440 and $t_3$ 450 during a cessation of the head flying on an air bearing while the head slides on the rotating disc. Thereafter, when the head resumes flying over the rotating disc on an air bearing, between times $t_3$ 450 and $t_4$ 460, the drag 410 gradually decreases until the target rotation speed is achieved. Thereafter, drag 410 remains at a relatively low and substantially constant level.

One conventional solution is to apply maximum current to the spindle motor of the mass storage device from the beginning of initialization, until the target rotation speed is achieved. However, this solution requires the implementation of a full power generation power supply in the mass storage device, which not only is relatively expensive apparatus, but also requires an external power supply because batteries can not supply sufficient power. As a result, applying full current throughout the entire spin-up process is not feasible. Furthermore, a mass storage device has limited quantities of power available. In addition, the use of maximum current through the entire spin-up process generates relatively large quantities of heat, which requires relatively more heat-resistant material in the mass storage device, which increases the weight and expense of the mass storage device.

Furthermore, during initialization, there are time periods when applying full maximum current to the spindle motor is not required in order to avoid anomalies. For example, in FIG. 1, between time $t_3$ 150 and time $t_4$ 160, the current 110 is less than the maximum current, yet, as shown in FIG. 4, between time $t_3$ 450 and time $t_4$ 460, the drag 410 is substantially less than maximum, and the drag 410 decreases over time. In this example, increasing the current 110 yields diminishing reductions a head/disc wear. Therefore, there are time periods in the initialization of the mass storage device where applying maximum current is a poor use of the limited quantities of power.

What is needed is a system, method and/or apparatus that manages or controls the input current to the spindle motor of the mass storage device in a manner that reduces the wear on the head and recording medium, yet provides efficient use of the limited power available to the mass storage device. More specifically, what is needed is a system, method and/or apparatus that manages or controls the input current to the spindle motor of the mass storage device that reduces the impact of drag, and increases the rotation speed and available torque during cessation of the head flying on an air bearing.

SUMMARY OF THE INVENTION

The above-mentioned shortcomings, disadvantages and problems are addressed by the present invention, which will be understood by reading and studying the following specification.

Systems and methods are provided through which the current to a spindle motor of the recording medium of a mass storage device is modulated to avoid anomalies in the operation of mass storage device and reduce power consumption. In the example of a disc drive, the current is modulated to prevent expected or predicted disturbances in the air bearing between a read/write head and the recording medium, and to reduce the power consumption when no disturbances are predicted or expected.

In one aspect of the present invention, a method for controlling a spindle motor of a mass storage device includes directing current to the motor and modulating the current to reduce interference in the interface between a head and a disc of the mass storage device. In varying further embodiments, the modulating step is performed during spin-up or spin-down of the mass storage device.

In a further embodiment of the modulating step that modulates the current in reference to a predetermined profile, the profile represents a relationship between time and quantity of current, and the modulating includes a method that includes monitoring a lapse of time. The method further includes referencing the representation of a quantity of current in the profile, from the lapse of time. The method also includes modulating the current to the motor in reference to the representation of the quantity of current in the profile.

In still another embodiment of the modulating step, the modulating step includes modulating the current in reference to a predetermined profile, wherein the predetermined profile reduces air-bearing instability. In still another embodiment of the modulating step, the modulating step includes modulating the current in reference to a predetermined profile, wherein the predetermined profile reduces takeoff air-bearing instability.

In another aspect of the present invention, a method generates a profile of modulated current of a spindle motor of a mass storage device. The method includes receiving performance data of the mass storage device. The data includes the quantity of current applied to the spindle motor at a plurality of discrete points in time. The data also includes at least one performance measurement. The method also includes determining a portion of the performance data that indicates a performance inadequacy that exceeds a predetermined threshold. The method also includes generating the profile in reference to the performance inadequacy and the performance data. In one embodiment of the method, the performance measurement is a measurement of takeoff air-bearing stability.

In yet another aspect of the present invention, an apparatus for controlling a spindle motor of a mass storage device includes a recording medium, a spindle motor operably attached to the recording medium of the mass storage device, and a modulator that modulates current to the spindle motor in a manner that avoids anomalies in the performance of the mass storage device thereby reducing wear on a head and the recording medium, and provides efficient use of a limited power available to the mass storage device, the modulator being operably coupled to the spindle motor. In another embodiment, the apparatus includes a predetermined profile. In one embodiment of the profile, the profile includes a plurality of representations of quantity of current and a corresponding plurality of times. In one embodiment the mass storage device is a disc drive.

In still another aspect of the present invention, an apparatus for generating a profile of modulated current of a spindle motor of a mass storage device includes a receiver of performance data of the mass storage device, wherein the data includes a quantity of current applied to the spindle motor at a each of a plurality of discrete points in time, and wherein the data also includes at least one performance measurement, a determiner of one or more portions of the performance data that indicate a performance inadequacy that exceeds a predetermined threshold or level, wherein the determiner is operably coupled to the receiver, and a generator of the profile in reference to the performance inadequacy and the performance data, wherein the generator is operably coupled to the determiner.

Advantageously, the systems, methods, and apparatus described manage or control the input current to the spindle motor of the mass storage device in a manner that reduces the wear on the head and recording medium, yet provides efficient use of the limited power available to the mass storage device. More specifically, systems, methods, and apparatus manage or control the input current to the spindle motor of the mass storage device in a manner that increases the rotation speed and available torque during interruption in the air bearing of a disc drive.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

The invention described in this application is useful for all types of disc drives, including hard-disc drives, optical drives (such as CDROMs), ZIP drives, floppy-disc drives, and any other type of drive.

The detailed description is divided into four sections. In the first section, a system level overview of the invention is presented. In the second section, methods for an embodiment of the invention are provided. In the third section, apparatus of the invention is described. Finally, in the fourth section, a conclusion of the detailed description is provided.

SYSTEM LEVEL OVERVIEW

Figure 1:
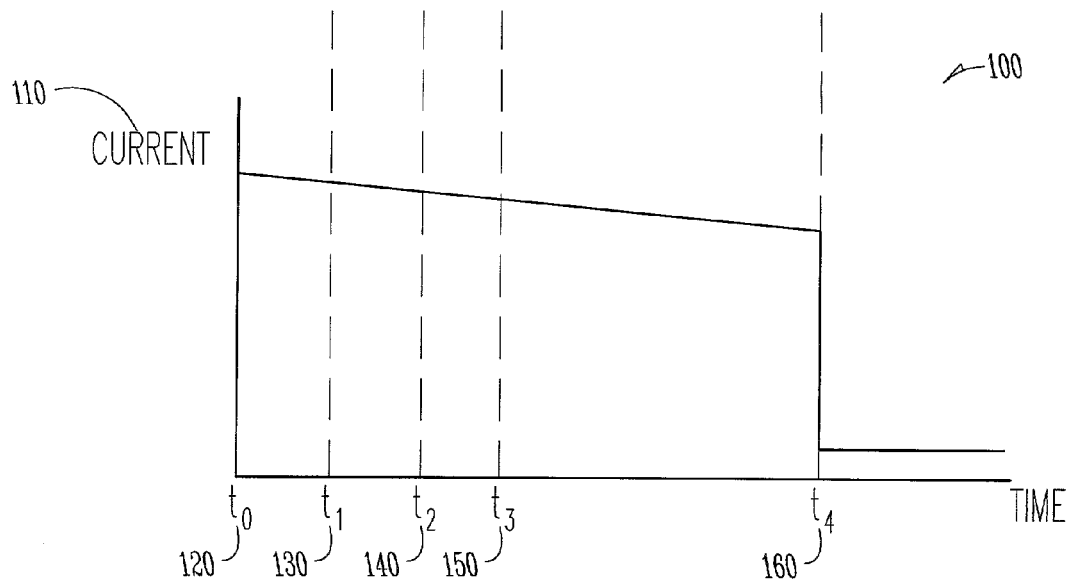
FIG. 1 is a chart of a relationship between input current and time in a conventional mass storage device during initialization.
Figure 2:
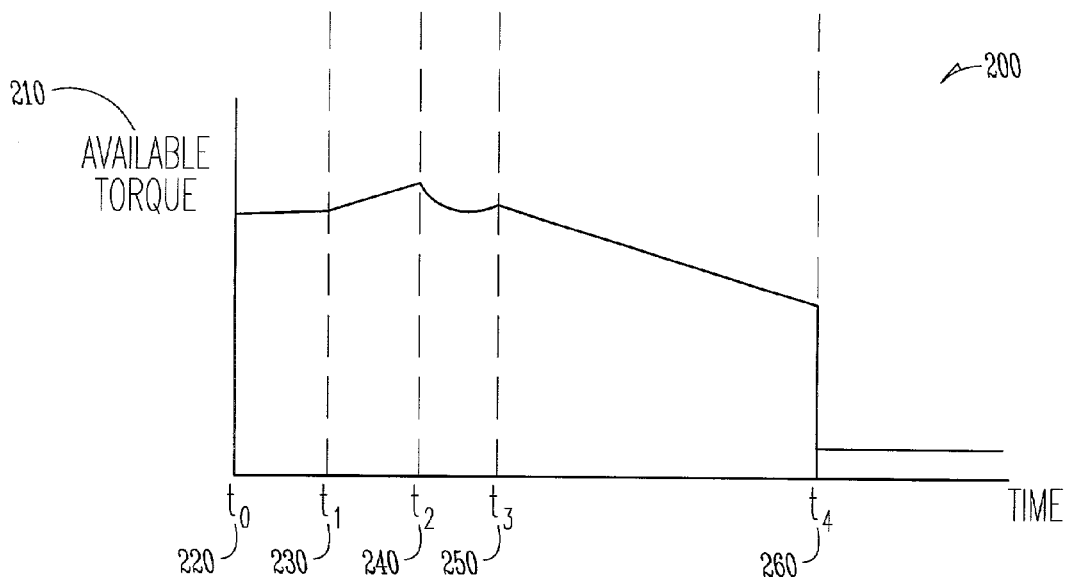
FIG. 2 is a chart of a relationship between available torque and time in a conventional mass storage device during initialization.
Figure 3:
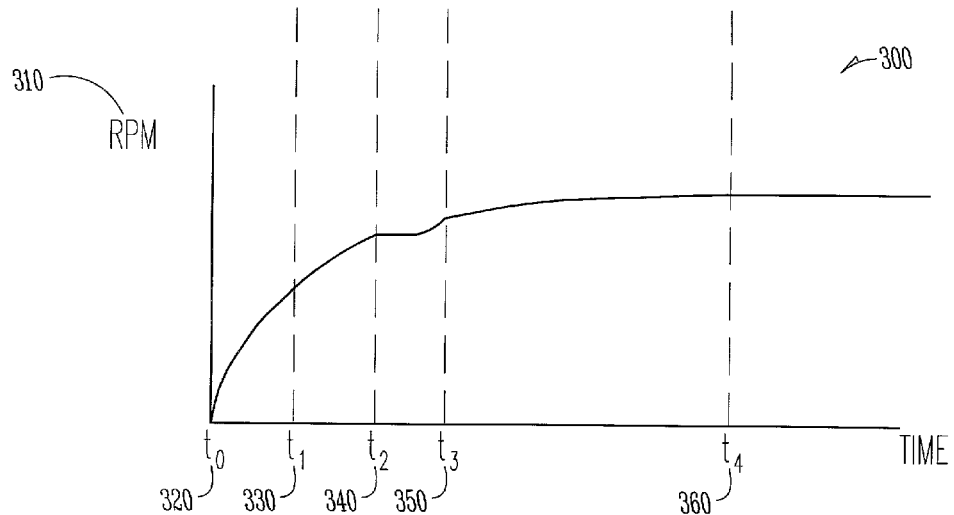
FIG. 3 is a chart of a relationship between rotation speed of the disc and time in a conventional mass storage device during initialization.
Figure 4:
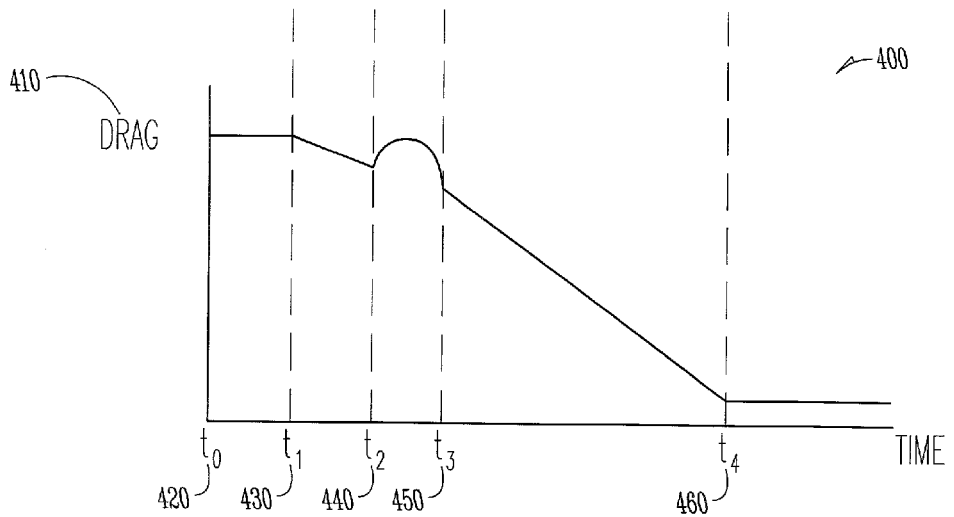
FIG. 4 is a chart of a relationship between drag and time in a conventional mass storage device during initialization.
Figure 5:
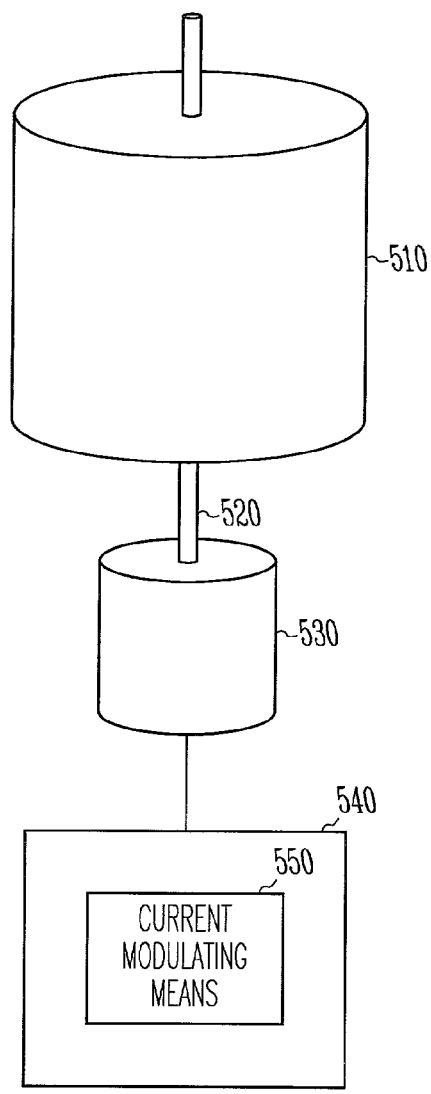
FIG. 5 is a block diagram that provides a system level overview of the operation of embodiments of the present invention.

FIG. 5 is a block diagram that provides a system level overview 500 of the operation of embodiments of the present invention. Embodiments of the invention operate in a multi-processing, multi-threaded operating environment on a computer, such as information handling system 2300 in FIG. 23.

System 500 is a system for controlling a spindle motor of a mass storage device of a mass storage device that includes a rotating recording medium 510. The recording medium 510 rotates around a spindle 520 that the medium 510 is operably coupled to. The spindle 520 is operably coupled to an electric motor 530 that provides mechanical energy to rotate the recording medium 510.

A processor 540 is operably coupled to the spindle motor. In varying embodiments, the processor 540 is a microprocessor or a microcontroller. The processor 540 includes a means 550 operative on the processor 540 for modulating a current directed to the spindle motor, to reduce interference in the interface between a head and a disc of the mass storage device, while providing efficient use of the limited power available to the mass storage device. In another embodiment of means 550, the means 550 manages or controls the input current to the spindle motor of the mass storage device in a manner that increases the motor current, and thus the rotation speed and available torque, during cessation of the head flying on an air bearing.

Figure 22:
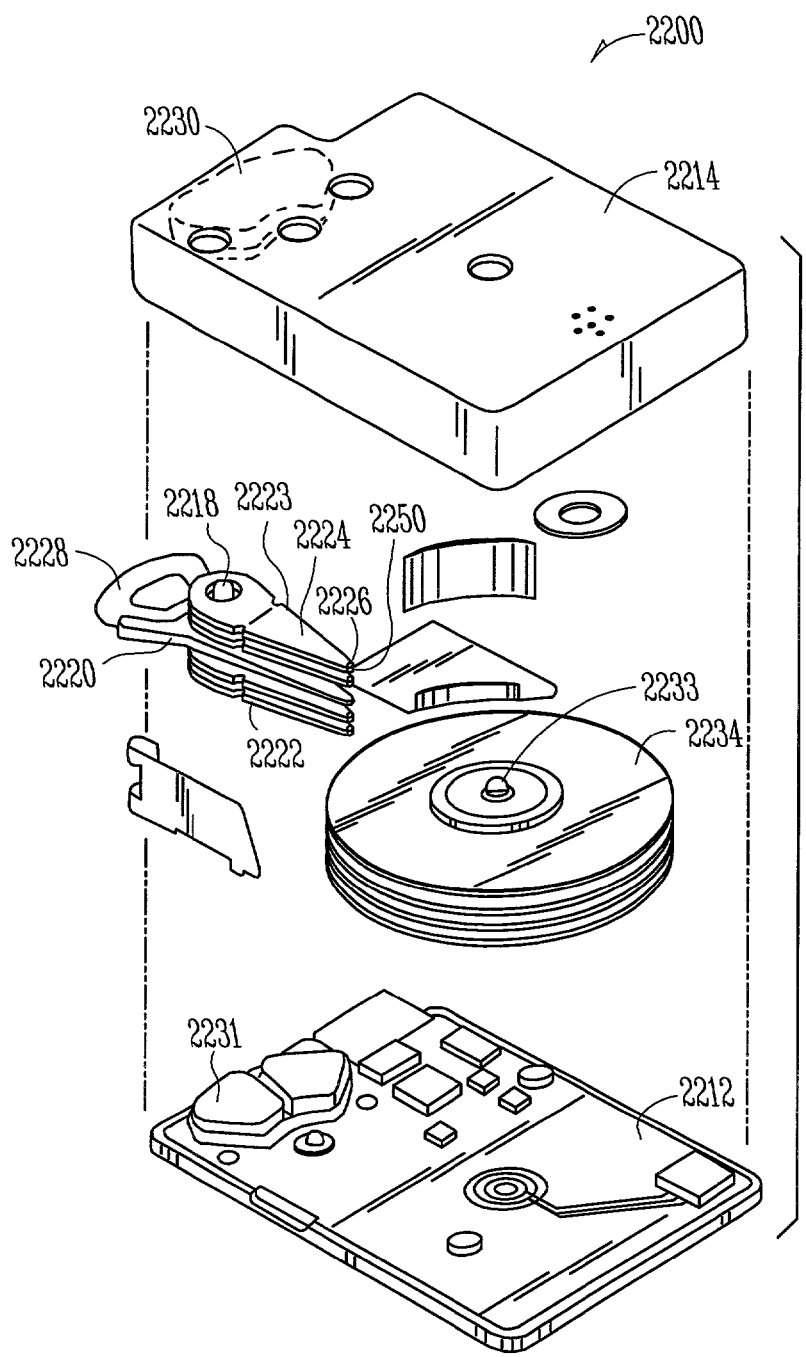
FIG. 22 is an exploded view of one embodiment of a disc drive of the present invention.

In one example, the mass storage device is a disc drive, such as magnetic disc drive 2200 in FIG. 22.

System 500 manages or controls the input current to the spindle motor of the mass storage device in a manner that increases the motor current to a recording medium of the mass storage device, yet provides efficient use of the limited power available to the mass storage device. More specifically, system 500 provide a system, method and/or apparatus that manages or controls the input current to the spindle motor of the mass storage device in a manner that increases the rotation speed and available torque during cessation of the air bearing of the head.

DESCRIPTION OF THE PREFERRED EMBODIMENT

Figure 6:
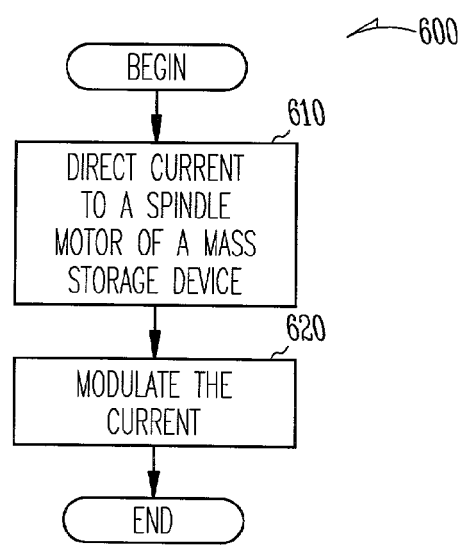
FIG. 6 is a flowchart of a method for controlling a spindle motor of a mass storage device, according to an embodiment of the invention.

FIG. 6 is a flowchart of a method 600 for controlling a spindle motor of a mass storage device, according to an embodiment of the invention. Method 600 reduces interference in the interface between a head and a disc of the mass storage device.

Method 600 includes directing current to the motor, in block 610. Thereafter, method 600 includes modulating the current, in block 620. In further varying embodiments, the modulating step 610 is performed during spin-up or spin-down of the mass storage device. Varying methods of modulating the current, in block 620, are described in FIGS. 7–10. In block 620, modulating is performed in a manner that reduces the wear on the head and recording medium, yet provides efficient use of the limited power available to the mass storage device. This is accomplished by modulating the current to avoid anomalies in the performance of the mass storage device. The anomalies include the interruption of the air bearing in a disc drive. In one example, the anomalies are avoided by increasing current to the spindle motor to avoid interruption of the air bearing. In another example, current is reduced when there is no expectation of an anomaly, in order to make efficient use of the limited power available to the mass storage device.

Method 600 manages or controls the input current to the spindle motor of the mass storage device in a manner that reduces the wear on the head and recording medium, yet provides efficient use of the limited power available to the mass storage device. More specifically, method 600 provides a method that manages or controls the input current to the spindle motor of the mass storage device in a manner that increases motor current, and thus the rotation speed and available torque, during cessation of the air bearing.

Figure 7:
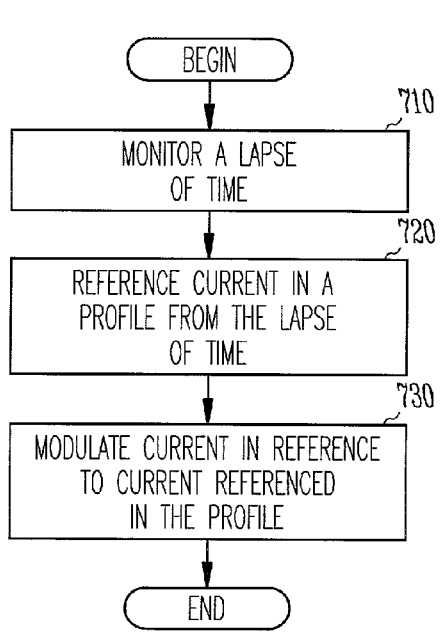
FIG. 7 is a flowchart of a method for modulating the current in reference to a predetermined profile, according to an embodiment of the invention.

FIG. 7 is a flowchart of a method 700 for modulating the current in reference to a predetermined profile, according to an embodiment of the invention. The predetermined profile represents a relationship between time and quantity of current. In one embodiment of the predetermined profile, the predetermined profile is a nonlinear predetermined profile that represents a nonlinear relationship between time and quantity of current. Generation or creation of the profile is described in FIG. 11. In embodiment of method 700, method 700 is an embodiment of the modulating step in block 620 in FIG. 6. In some embodiments, method 700 is performed by apparatus 1500 in FIG. 15.

Method 700 includes monitoring a lapse of time, in block 710. In one embodiment, the time and/or the lapse of time is provided by a clock device that is a component of the microprocessor or microcontroller of the mass storage device.

Method 700 further includes referencing the representation of a quantity of current in the profile, from the lapse of time, in block 720. In one embodiment of referencing 720, the lapse of time is used as an index into the profile to identify a particular quantity or level of current. In another embodiment of referencing, the numerical lapse of time is provided to the profile, and the profile returns the corresponding or associated quantity of current, in block 720.

Method 700 also includes modulating 730 the current to the motor in reference to the representation of the quantity of current in the profile. Method 700 is performed repeatedly until the lapse of time exceeds the range of time in the profile.

Figure 8:
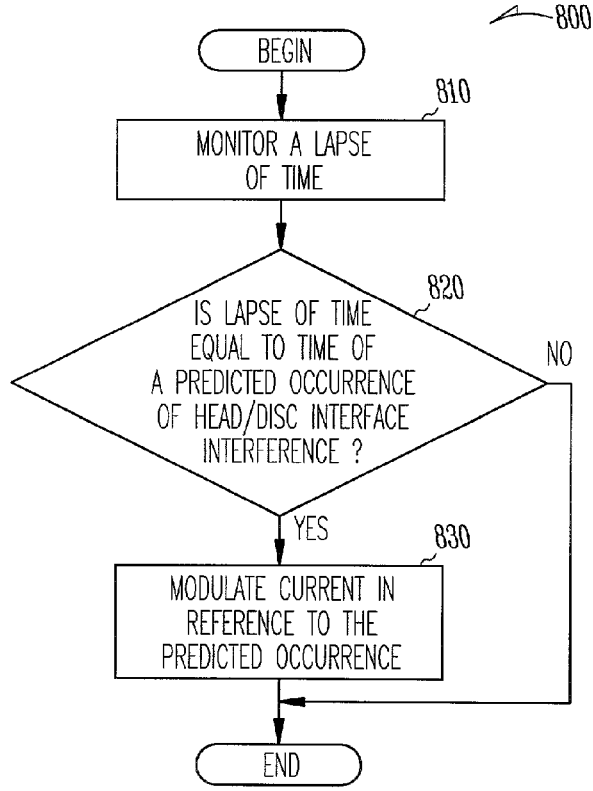
FIG. 8 is a flowchart of a method for modulating the current in reference to a predicted occurrence of interference in the interface between a head and a disc of the mass storage device that exceeds a predetermined threshold of interference in the interface between a head and a disc of the mass storage device, according to an embodiment of the invention.

FIG. 8 is a flowchart of a method 800 for modulating the current in reference to a predicted occurrence of interference in the interface between a head and a disc of the mass storage device that exceeds a predetermined threshold of interference in the interface between a head and a disc of the mass storage device, according to an embodiment of the invention. In one embodiment of method 800, method 800 is an embodiment of the modulating step, in block 620 in FIG. 6. In some embodiments, method 800 is performed by apparatus 1600 in FIG. 16.

Method 800 includes monitoring a lapse of time, in block 810. In one embodiment, the time and/or the lapse of time is provided by a clock device that is a component of the microprocessor or microcontroller of the mass storage device.

Method 800 also includes comparing the lapse of time to the time of a predicted occurrence of interference in the interface between a head and a disc of the mass storage device that exceeds a predetermined threshold of interference in the interface between a head and a disc of the mass storage device, in block 820. Method 800 also includes modulating the current in reference to the predicted occurrence when the lapse of time is substantially equal to the time of the predicted occurrence, in block 830.

Method 800 is performed repeatedly until the lapse of time exceeds a range of time associated with a plurality of predicted occurrences of interference in the interface between a head and a disc of the mass storage device.

Figure 9:
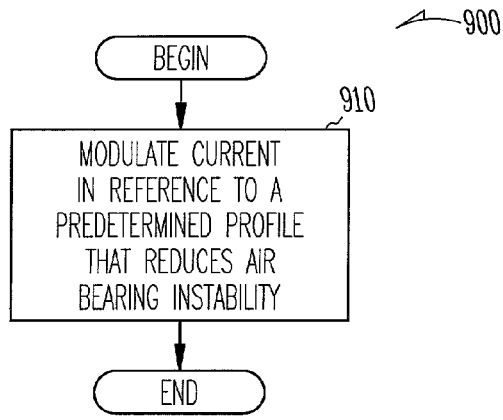
FIG. 9 is a flowchart of a method for modulating the current, according to an embodiment of the invention.

FIG. 9 is a flowchart of a method 900 for modulating the current, according to an embodiment of the invention. In one embodiment of method 900, method 900 is an embodiment of the modulating step, in block 620 in FIG. 6.

Method 900 includes modulating the current in reference to a predetermined profile, in block 910. The predetermined profile is designed to reduce air-bearing instability in the interface of the head and the disc. Generation or creation of the profile is described in FIG. 11. An air-bearing is a support device in which a column or chamber of air-permits the free travel of a mobile part. In the example of disc drives, an air-bearing is a thin layer of air that supports or suspends the head over the rotating disc, and permits the free travel of the head parallel to the disc.

Figure 10:
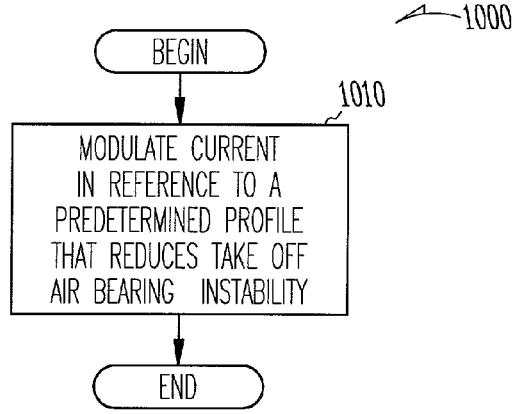
FIG. 10 is a flowchart of a method for modulating the current, according to an embodiment of the invention.

FIG. 10 is a flowchart of a method 1000 for modulating the current, according to an embodiment of the invention. In one embodiment of method 1000, method 1000 is an embodiment of the modulating step, in block 620 in FIG. 6. Method 1000 includes modulating 1010 the current in reference to a predetermined profile. The predetermined profile is designed to reduce takeoff air-bearing instability in the interface of the head and the disc. Generation or creation of the profile is described in FIG. 11.

Figure 11:
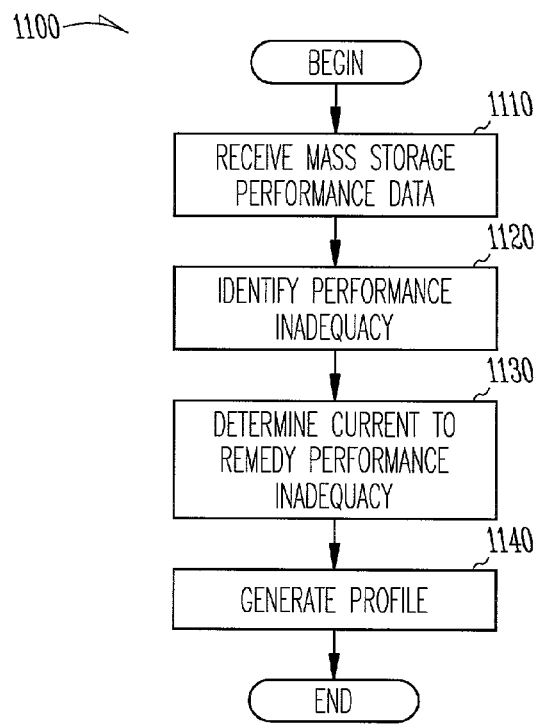
FIG. 11 is a flowchart of a method for generating a profile of modulated current of a spindle motor of a mass storage device, according to an embodiment of the invention.

FIG. 11 is a flowchart of a method 1100 for generating a profile of modulated current of a spindle motor of a mass storage device, according to an embodiment of the invention. The profile is produced by the process of method 1100.

Method 1100 includes receiving performance data of the mass storage device, in block 1110. In some embodiments, the data includes the quantity of current applied to the spindle motor at a plurality of discrete points in time. The data also includes at least one performance measurement. In one embodiment of method 1100, the performance measurement is a measurement of air-bearing stability. In one embodiment of method 1100, the performance measurement is a measurement of takeoff air-bearing stability.

Method 1100 also includes determining or identifying one or more portions of the performance data that indicate a performance inadequacy that exceeds a predetermined threshold or level, in block 1120. Method 1100 also includes generating the profile in reference to the performance inadequacy and the performance data, in block 1140. In one embodiment, the generating in block 1140 includes determining, identifying or calculating in block 1130 a level or quantity of current that is expected or predicted, or is known, to remedy to one or more performance inadequacies.

Figure 12:
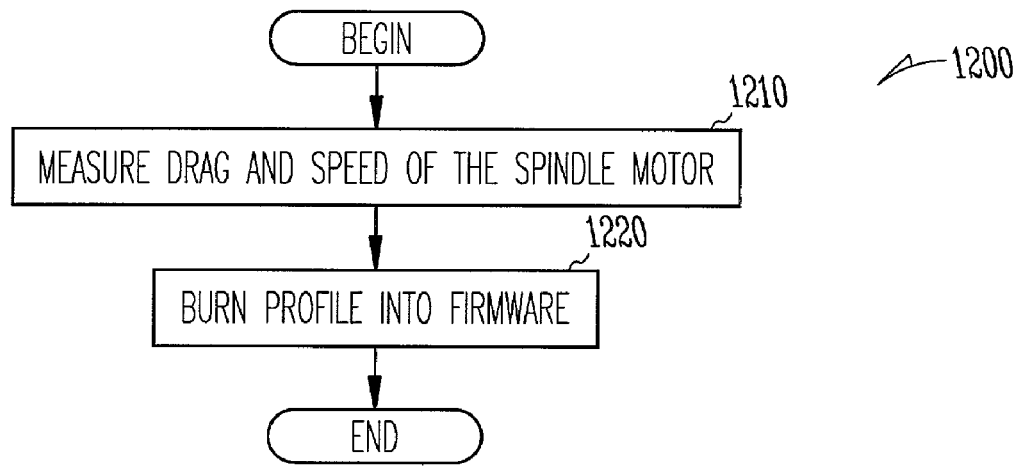
FIG. 12 is a flowchart of a method of steps additional to generating a profile of modulated current of a spindle motor of a mass storage device in FIG. 11, according to an embodiment of the invention.

FIG. 12 is a flowchart of a method 1200 of steps additional to generating a profile of modulated current of a spindle motor of a mass storage device in method 1100 in FIG. 11, according to an embodiment of the invention. In some embodiments, method 1200 is performed in a mass storage device test laboratory, by a dedicated test station. In method 1200, the performance data includes measurement of a drag component and measurement of speed (e.g. RPM).

Method 1200 includes measuring a drag and speed of the spindle motor of the mass storage device in block 1210. In various embodiments, the measuring is performed using load cells, gram gages, acoustic emission, and/or accelerometers. In some embodiments, block 1210 is performed before receiving performance data of the mass storage device, in block 1110 in FIG. 11.

Method 1200 also includes entering, storing, or burning the profile into the firmware of a processor of a mass storage device in block 1220. One example of the processor is processor 540 in FIG. 5. The profile includes the drag and speed data measured in block 1210. Block 1220 is performed after generating the profile in block 1140 in FIG. 11.

Figure 13:
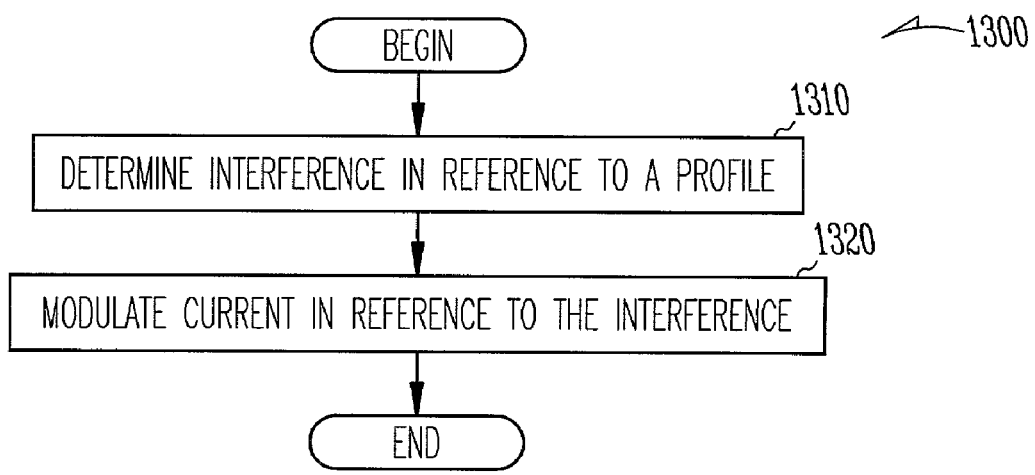
FIG. 13 is a flowchart of a method for dynamically modulating current based on dynamic performance data during operation, according to an embodiment of the invention.

FIG. 13 is a flowchart of a method 1300 for dynamically modulating current based on dynamic performance data during operation, according to an embodiment of the invention. Method 1300 is performed by a disc storage device.

Method 1300 includes determining interference between a head of the disc storage device and a disc of the disc storage device in reference to a performance profile, and in reference to dynamic performance data during operation, in block 1310. In block 1310, interference during operation of the disc storage device is determined. One example of the disc storage device is magnetic disc drive 2200 in FIG. 22, in which one example of the disc is discs 2234 in FIG. 22. Another example of the disc is rotating recording medium 510 in FIG. 5, and the recording medium 1410 in FIG. 14.

In some embodiments of block 1310, during spin up of the disc, the rotation speed of the disc is measured at predetermined intervals and the speed is compared to a look up table of values in the profile. Failing to meet a predetermined value indicates interference. In some embodiments, the time per revolution is measured and compared to an expected time. Failure to meet the expected time is an indication of interference. In some embodiments, each spindle revolution, or multiple or sub-multiple revolutions, the speed is measured and compared to predicted values and a failure to meet the predicted value in the profile indicates interference. In some embodiments, the rate of change (acceleration or deceleration) of speed is sampled and compared to the last sample and used to determine the interference. Samples are made at each revolution, or multiple or sub-multiple revolutions.

Method 1300 also includes modulating current to the disc in reference to the interference in block 1320. One embodiment of modulating includes modulating the current in block 620 in FIG. 6. Method 1300 modules current in reference to observed performance data from the disc and in reference to a performance profile. Method 1500 controls the input current to the spindle motor of the mass storage device in a manner that reduces interference in the interface between a head and a disc of the disc storage device.

Figure 14:
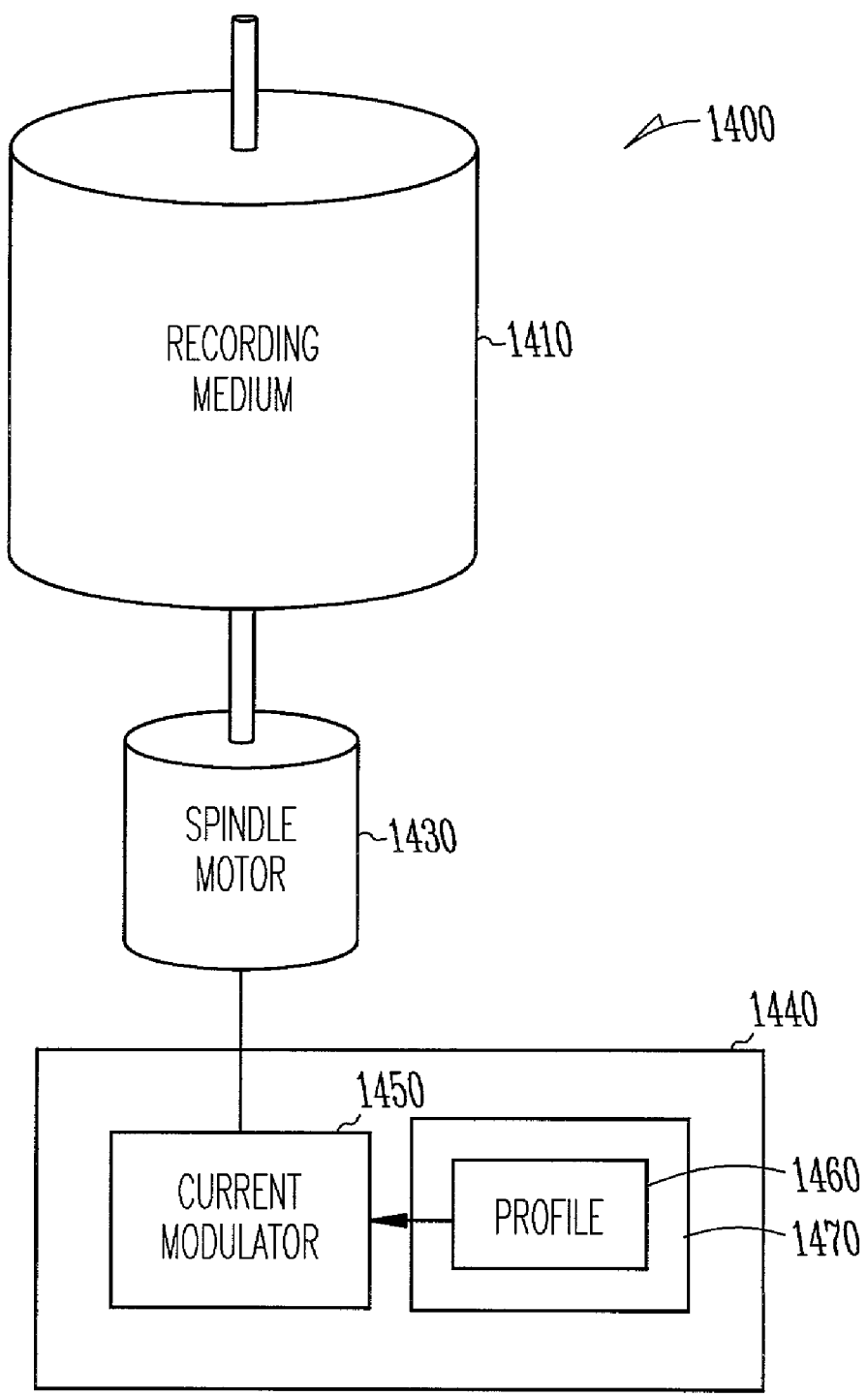
FIG. 14 is a block diagram of an apparatus for controlling a spindle motor of a mass storage device, according to an embodiment of the invention.

FIG. 14 is a block diagram of an apparatus 1400 for controlling a spindle motor of a mass storage device, according to an embodiment of the invention. Apparatus 1400 reduces interference in the interface between a head and a disc of the mass storage device. Apparatus 1400 includes a modulator 1450 of current. The current is directed to a spindle motor 1430 of a recording medium 1410 of a mass storage device 1420. The current is modulated by modulator 1450 in a manner that reduces the wear on the head and recording medium, yet provides efficient use of the limited power available to the mass storage device 1420. This is accomplished by modulating the current to avoid anomalies in the performance of the mass storage device 1420. The anomalies include the interruption of the air bearing in disc drive. In one example, the anomalies are avoided by increasing current to the spindle motor to avoid interruption of the air bearing. In another example, current is reduced when there is no expectation of an anomaly, in order to make efficient use of the limited power available to the mass storage device 1420.

Apparatus 1400 manages or controls the input current to the spindle motor of the mass storage device 1420 in a manner that reduces the wear on the head and recording medium, yet provides efficient use of the limited power available to the mass storage device 1420. More specifically, apparatus 1400 provides an apparatus that manages or controls the input current to the spindle motor of the mass storage device 1420 in a manner that increases motor current, and thus increases the rotation speed and available torque, during cessation of the air bearing.

In further varying embodiments, the modulator 1450 operates during spin-up or spin-down of the mass storage device 1420. Varying embodiments of modulator 1450 are described in FIG. 15 and FIG. 16. The modulator 1450 operates on a processor 1440 of the mass storage device 1420.

In one embodiment of apparatus 1400, the modulator is operably coupled to a storage device 1470 that stores a predetermined profile 1460 that the modulator 1450 obtains. In one embodiment, the predetermined profile 1460 is designed to reduce air-bearing instability in the interface of the head and the disc. In another embodiment, the predetermined profile 1460 is designed to reduce takeoff air-bearing instability in the interface of the head and the disc. A method of generation or creation of the profile is described in FIG. 11 and an apparatus that generates or creates the profile is described in FIG. 17. In the embodiment shown, the storage device 1470 is memory that is a component of the processor 1440, or operably coupled to the processor

1440. In another embodiment, the storage device 1470 is the storage medium 1410, in which, in a further embodiment, the profile 1460 is stored in a reserved portion of the recording medium 1410.

Figure 15:
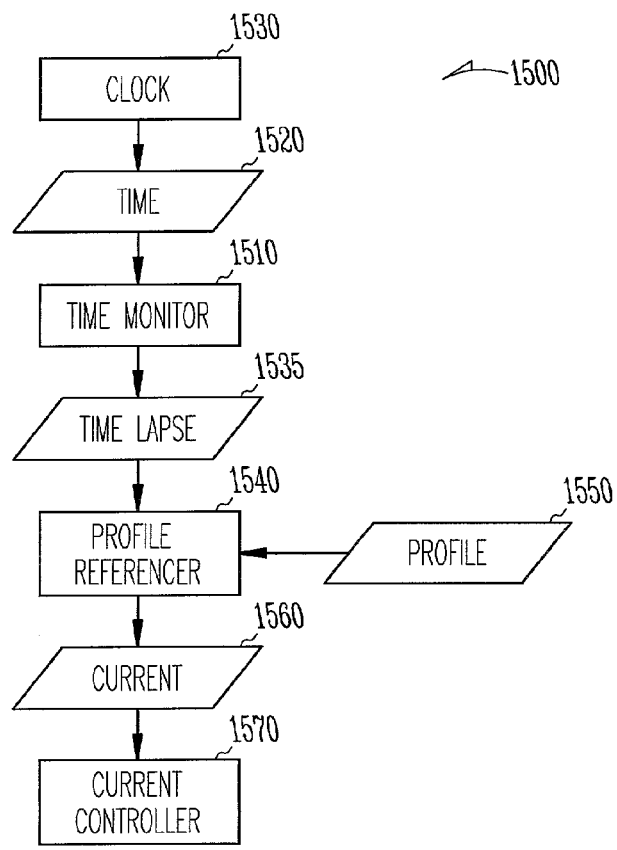
FIG. 15 is a block diagram of a current modulator for modulating the current in reference to a predetermined profile, according to an embodiment of the invention.

FIG. 15 is a block diagram of a current modulator 1500 for modulating the current in reference to a predetermined profile, according to an embodiment of the invention. The predetermined profile represents a relationship between time and quantity of current. In one embodiment of the predetermined profile, the predetermined profile is a nonlinear predetermined profile that represents a nonlinear relationship between time and quantity of current. A method of generation or creation of the profile is described in FIG. 11 and an apparatus that generates or creates the profile is described in FIG. 17. In one embodiment of apparatus 1500, apparatus 1500 is an embodiment of the modulator 1450 in FIG. 14. In some embodiments, apparatus 1500 performs method 700 in FIG. 7.

Apparatus 1500 includes a time monitor 1510 of a lapse of time 1535. In one embodiment, the monitor 1510 obtains time 1520 from a clock device 1530. The clock device 1530 is a component of a microprocessor or microcontroller of a mass storage device. The monitor generates a time lapse 1535 from the time 1520.

Apparatus 1500 further includes a profile referencer 1540. The profile references the profile 1550 using the lapse of time 1535 to extract or receive a representation of a measure, quantity or level of current 1560 in the profile. In one embodiment of the referencer 1540, the lapse of time 1535 is used as an index into the profile 1550 to identify a particular quantity or level of current 1560. In another embodiment of the referencer 1540, a numerical lapse of time 1535 is provided to the profile 1550, and the profile 1550 returns the corresponding or associated quantity of current 1560. Apparatus 1500 also includes a controller 1570 of the current to the motor in reference to the representation of the quantity of current in the profile 1560. Apparatus 1500 performs repeatedly until the lapse of time 1535 exceeds a range of time in the profile 1550.

Figure 16:
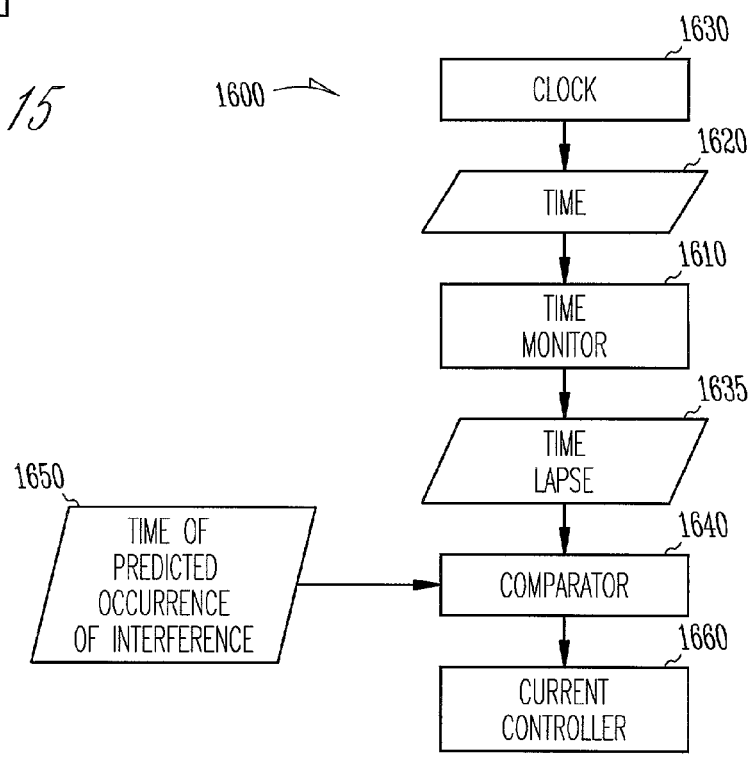
FIG. 16 is a block diagram of an apparatus for modulating the current in reference to a predicted occurrence of interference in the interface between a head and a disc of the mass storage device that exceeds a predetermined threshold of interference in the interface between a head and a disc of the mass storage device, according to an embodiment of the invention.

FIG. 16 is a block diagram of an apparatus 1600 for modulating the current in reference to a predicted occurrence of interference in the interface between a head and a disc of the mass storage device that exceeds a predetermined threshold of interference in the interface between a head and a disc of the mass storage device, according to an embodiment of the invention. In one embodiment of apparatus 1600, apparatus 1600 is an embodiment of the modulator step 1450 in FIG. 14.

Apparatus 1600 includes a time monitor 1610 of a lapse of time 1635. In one embodiment, the monitor 1610 obtains the time from a clock device 1630 that is a component of a microprocessor or microcontroller of a mass storage device. The monitor generates a time lapse 1635 from the time 1620. In some embodiments, apparatus 1600 performs method 800 in FIG. 8.

Apparatus 1600 also includes comparator 1640 of the lapse of time 1635 to the time 1650 of a predicted occurrence of interference in the interface between a head and a disc of the mass storage device that exceeds a predetermined threshold of interference in the interface between a head and a disc of the mass storage device. Apparatus 1600 also includes controller 1660 of the current in reference to the predicted occurrence when the lapse of time 1635 is substantially equal to the time of the predicted occurrence.

Apparatus 1600 operates until the lapse of time 1635 exceeds a range of time associated with a plurality of predicted occurrences of interference in the interface between a head and a disc of the mass storage device.

Figure 17:
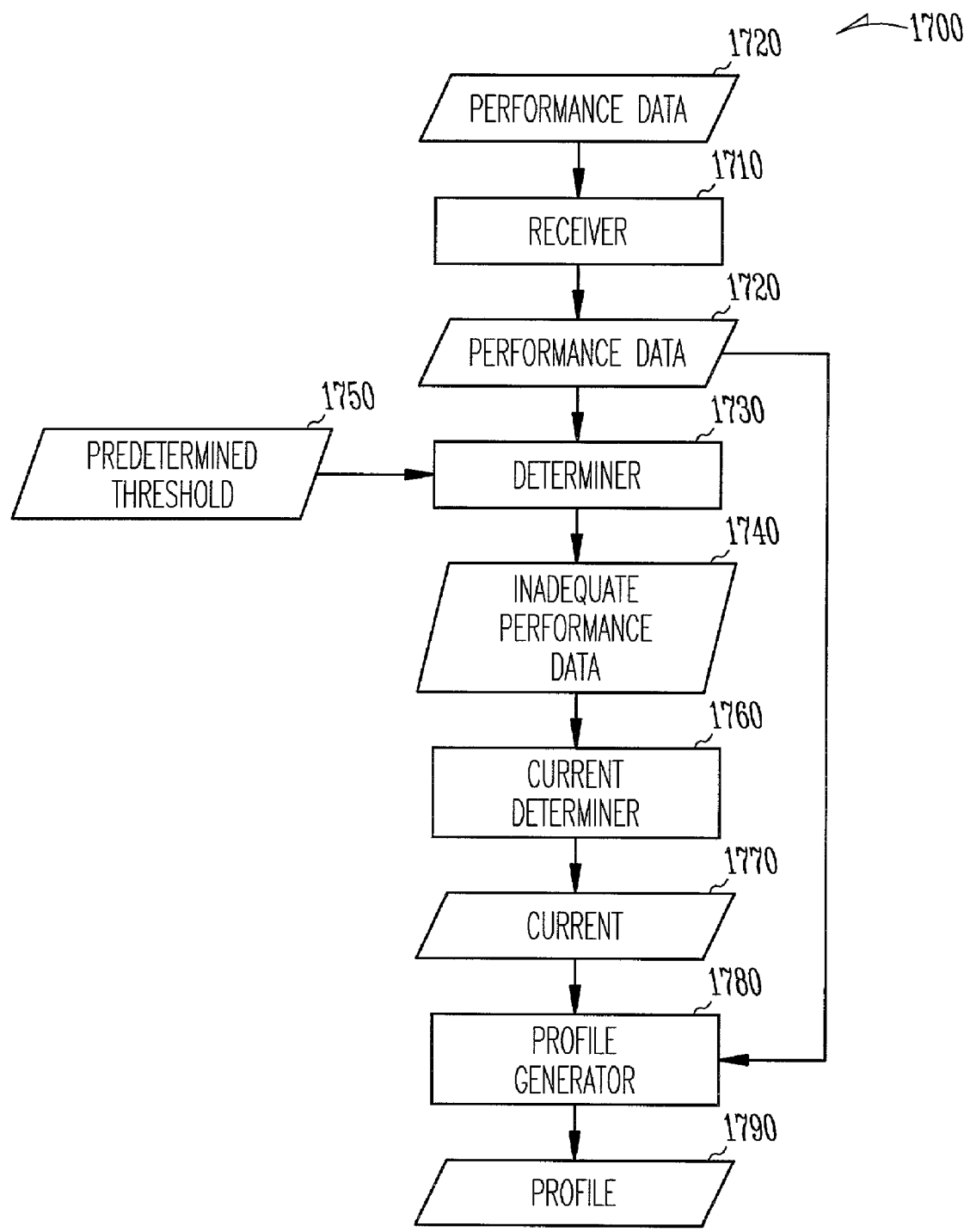
FIG. 17 is a block diagram of an apparatus for generating a profile of modulated current of a spindle motor of a mass storage device, according to an embodiment of the invention.

FIG. 17 is a block diagram of an apparatus 1700 for generating a profile of modulated current of a spindle motor of a mass storage device, according to an embodiment of the invention. In some embodiments, apparatus 1700 performs method 1100 in FIG. 11.

Apparatus 1700 includes a receiver 1710 performance data 1720 of the mass storage device. The data 1720 includes the quantity of current applied to the spindle motor at a plurality of discrete points in time. The data also includes at least one performance measurement. In one embodiment of the data 1720, the performance measurement is a measurement of air-bearing stability. In one embodiment of the data 1720, the performance measurement is a measurement of takeoff air-bearing stability.

Apparatus 1700 also includes a determiner or identifier 1730 of one or more portions 1740 of the performance data 1720 that indicate a performance inadequacy that exceeds a predetermined threshold or level 1750. Apparatus 1700 also includes a generator 1780 of the profile 1790 in reference to the performance inadequacy 1740 and the performance data 1720. In one embodiment, the generator 1760 includes a determiner, identifier or calculator 1760 of a level or quantity of current 1770 that is expected or predicted, or is known, to remedy or compensate the one or more performance inadequacies 1740.

The components of apparatus 1400, 1500, 1600 and 1700 can be embodied as computer hardware circuitry or as a computer-readable program, or a combination of both.

More specifically, in the computer-readable program embodiment, the programs can be structured in an object-orientation using an object-oriented language such as Java, Smalltalk or C++, and the programs can be structured in a procedural-orientation using a procedural language such as C or assembly language. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI).

Figure 18:
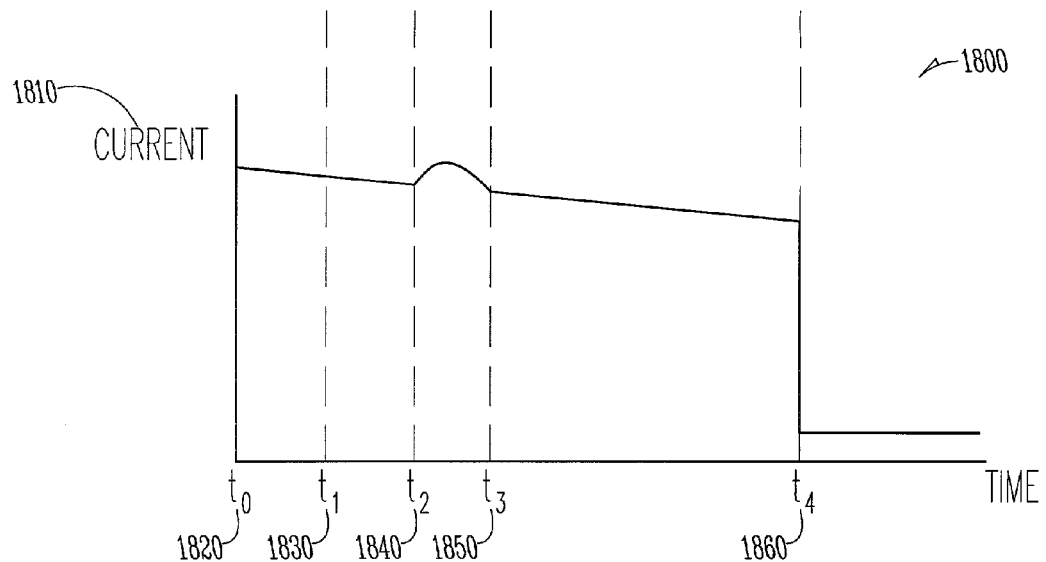
FIG. 18 is a chart of an example of a relationship between input current and time in a mass storage device using the present invention during initialization.
Figure 19:
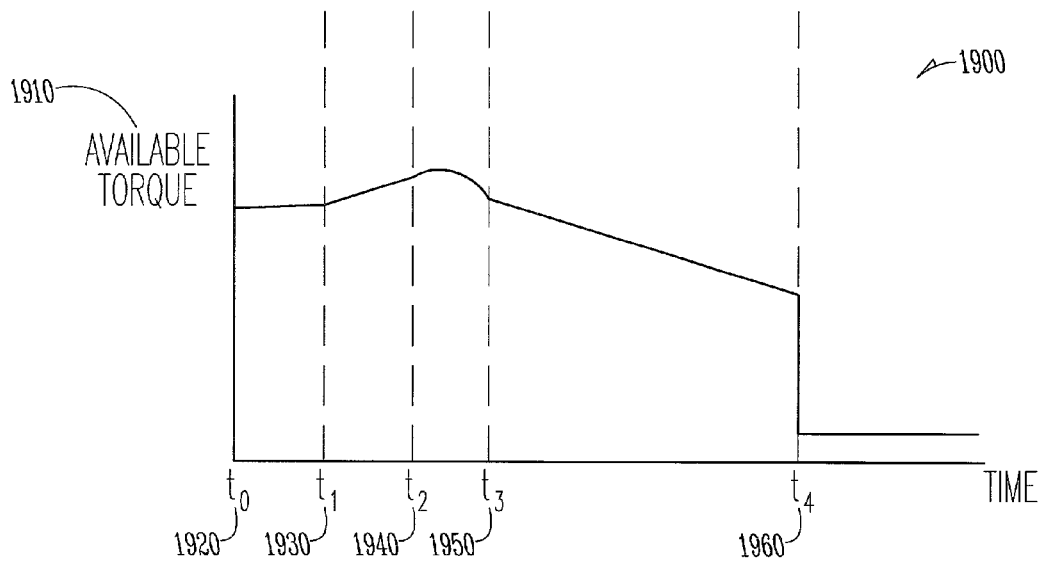
FIG. 19 is a chart of a relationship between available torque and time in a mass storage device using the present invention during initialization.
Figure 20:
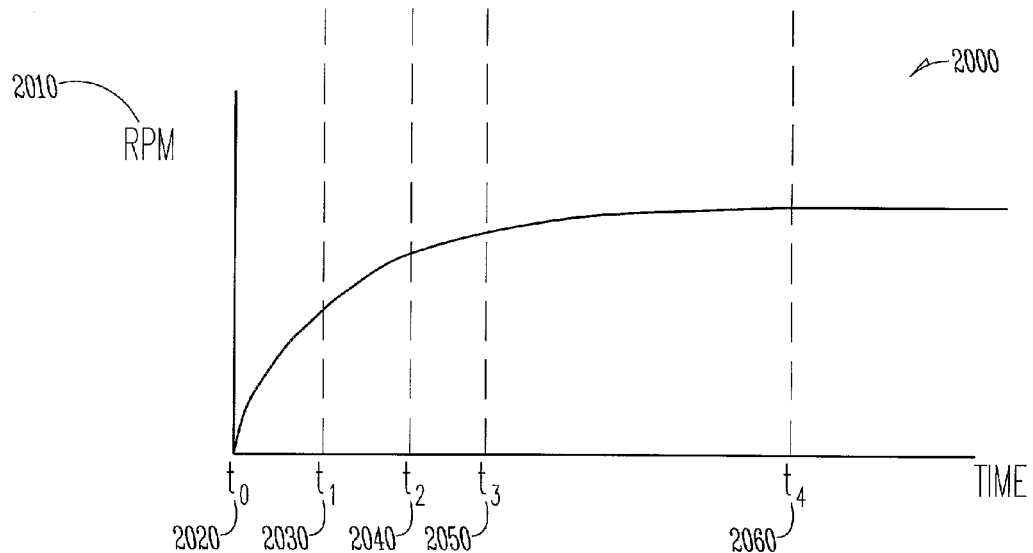
FIG. 20 is a chart of a relationship between rotation speed of the disc and time in a mass storage device using the present invention during initialization.
Figure 21:
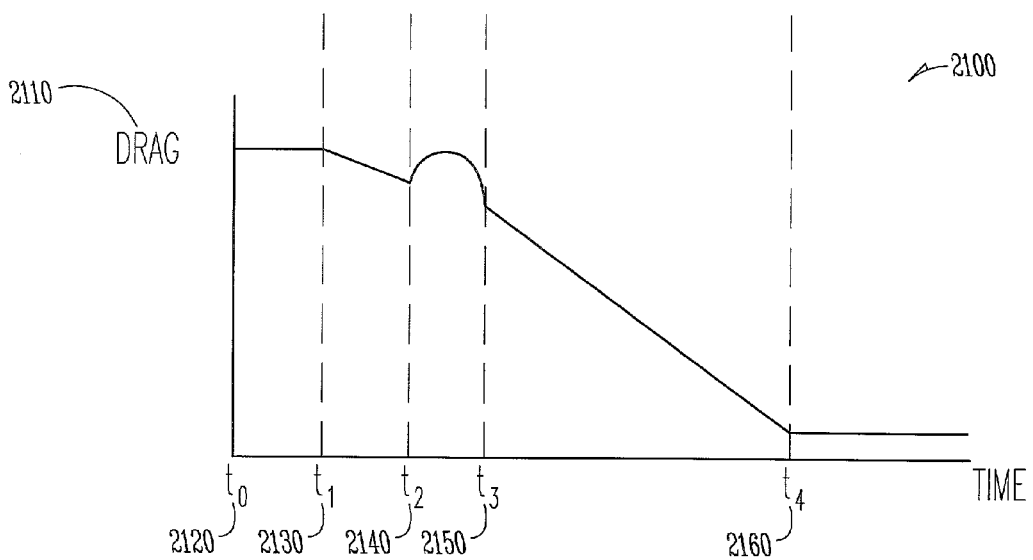
FIG. 21 is a chart of a relationship between drag and time in a mass storage device using the present invention during initialization.

FIGS. 18–21 illustrate the effect that modulating the current in FIG. 18 has on available torque in FIG. 19, RPM in FIG. 20, and drag in FIG. 21. FIGS. 18–21 contrast with FIGS. 1–4 of conventional systems.

FIG. 18 is a chart 1800 of an example of a relationship between input current and time in a mass storage device using the present invention during initialization. During initialization, also known as spin-up, of the mass storage device, the spindle motor of the mass storage device receives a substantially linear monotonically decreasing quantity of current 1810. The current 1810 is linearly decreased from the beginning time of the initialization $t_0$ 1820, through various other times, such as $t_1$ 1830 and $t_2$ 1840. The current is modulated between $t_2$ 1840 and $t_3$ 1850, in anticipation of a disturbance in the air bearing. The effects of the disturbance in the air bearing as shown in one example as a disturbance in the available torque between $t_2$ 240 in FIG. 2 and $t_3$ 250 in FIG. 2, disturbance in the R.P.M. between $t_2$ 340 in FIG. 3 and $t_3$ 350 in FIG. 3, and as disturbance in the drag between $t_2$ 440 in FIG. 4 and $t_3$ 450 in FIG. 4. The modulation of current between $t_2$ 1840 and $t_3$ 1850 solves the disturbances shown in FIGS. 2–4.

After $t_3$ 1850, the current is steadily decreased until a target rotation speed is achieved at time $t_4$ 1860, after which, a decreased and constant quantity of current 1810 is applied to the motor to maintain the target rotation speed.

FIG. 19 is a chart 1900 of a relationship between available torque and time in a mass storage device using the present invention during initialization. In general, the quantity of available torque 1910 decreases during spin-up of the disc. The quantity of available torque 1910 decreases from the beginning time of the initialization $t_0$ 1920, through various other times, such as $t_1$ 1930, $t_2$ 1940, and $t_3$ 1950, until a target rotation speed is achieved at time $t_4$ 1960, after which, no torque is available when the quantity of current input to the motor is held constant, as shown in FIG. 18, to maintain the target rotation speed.

In FIG. 19, the available torque 1910 is less than maximum between times $t_0$ 1920 and $t_1$ 1930, while the head is sliding on the rotating disc. When the head flies over the rotating disc on an air bearing, between times $t_1$ 1930 and $t_2$ 1940, the available torque 1910 increases. However, when the current is modulated, such as the cessation of the head flying on an air bearing, either during an intermittent bounce off of the disc, or a longer term sliding of the head on the rotating disc, the available torque 1910 modulates during that time. For example a decrease in available torque 1910 occurs between times $t_2$ 1940 and $t_3$ 1950 when the current is modulated during a disturbance in the air bearing. Thereafter, between times $t_3$ 1950 and $t_4$ 1960, the available torque 1910 gradually decreases as the rotation speed increases, as shown in FIG. 20.

FIG. 20 is a chart 2000 of a relationship between rotation speed of the disc and time in a mass storage device using the present invention during initialization. In general, the rotation speed (RPM) 2010 increases during spin-up of the disc. The rotation speed 2010 increases from the beginning time of the initialization $t_0$ 2020, through various other times, such as $t_1$ 2030, $t_2$ 2040, and $t_3$ 2050, until a target rotation speed is achieved at time $t_4$ 2060. After the target rotation speed is achieved, the rotation speed 2010 is held substantially constant through a constant input of current, as shown in FIG. 18.

In FIG. 20, the rotation speed 2010 is less than maximum between times $t_0$ 2020 and $t_1$ 2030, while the head is sliding on the rotating disc. When the head flies over the rotating disc on an air bearing, between times $t_1$ 2030 and $t_2$ 2040, the rotation speed 2010 increases. However, when the air bearing is disturbed, either during an intermittent bounce off of the disc, or a longer term sliding of the head on the rotating disc, the current is modulated in a manner that substantially maintains the increase in rotation speed 2010. Thereafter, between times $t_3$ 2050 and $t_4$ 2060, the rotation speed 2110 gradually increases until the target rotation speed is achieved.

FIG. 21 is a chart 2100 of a relationship between drag and time in a mass storage device using the present invention during initialization. In general, drag 2110, decreases during spin-up of the disc. The drag 2110 generally decreases from the beginning time of the initialization $t_0$ 2120, through various other times, such as $t_1$ 2130, $t_2$ 2140, and $t_3$ 2150, until a rotation speed is achieved at time $t_4$ 2160. After the target rotation speed is achieved, the drag 2110 remains substantially constant through a constant input of current, as shown in FIG. 18.

In FIG. 21, the drag 2110 is substantially at maximum between times $t_0$ 2120 and $t_1$ 2130, while the head is sliding on the rotating disc, and before an air bearing forms. When the head flies over the rotating disc on an air bearing, between times $t_1$ 2130 and $t_2$ 2140, the drag 2110 decreases. However, when an anomaly occurs, such as the cessation of the head flying on an air bearing, either during an intermittent bounce off of the disc, or a longer term sliding of the head on the rotating disc, the current is modulated. For example, an increase in drag 2110 would occur between times $t_2$ 2140 and $t_3$ 2150 during a cessation of the head flying on an air bearing while the head slides on the rotating disc and the acceleration of the disc would be reduced, as shown in between times $t_2$ 440 and $t_3$ 450 in FIG. 4. Instead, according to the teachings of the present invention, the current is increased, which maintains the air bearing, and overcomes the increase in drag 2110 that occurs as a result of the interruption in the air bearing between times $t_2$ 2140 and $t_3$ 2150. Thereafter, between times $t_3$ 2150 and $t_4$ 2160, the drag 2110 gradually decreases until the target rotation speed is achieved. Subsequently, drag 2110 remains at a relatively low and substantially constant level.

FIG. 22 is an exploded view of one embodiment of a disc drive of the present invention, this embodiment showing one type of magnetic disc drive 2200 having a rotary actuator. The disc drive 2200 is one example of mass storage devices, such as compact disc (CDROM) devices, tape cartridge devices, digital versatile disc (DVD) or digital video disc (DVD) devices. Other embodiments include other configurations and data recording and/or reading technologies. The disc drive 2200 includes a housing or base 2212, and a cover 2214. The base 2212 and cover 2214 form a disc enclosure. Rotatably attached to the base 2212 on an actuator shaft 2218 is an actuator assembly 2220. The actuator assembly 2220 includes a comb-like structure 2222 having a plurality of arms 2223. Attached to the separate arms 2223 on the comb 2222, are load beams or load springs 2224. Load beams or load springs are also referred to as suspensions. Attached at the end of each load spring 2224 is a slider 2226, which carries a magnetic transducer 2250. In some embodiments, transducer 2250 includes an electromagnetic coil write head and a magneto-resistive read head. The slider 2226 with the transducer 2250 form what is often called the head. It should be noted that many sliders have one transducer 2250 and that is what is shown in the figures. It should also be noted that this invention is equally applicable to sliders having more than one transducer, such as what is referred to as an MR or magneto resistive head in which one transducer 2250 is generally used for reading and another is generally used for writing. On the end of the actuator assembly 2220 opposite the load springs 2224 and the sliders 2226 is a voice coil 2228.

Attached within the base 2212 is a first magnet 2231 and/or a second magnet 2230. As shown in FIG. 22, the second magnet 2230 is associated with the cover 2214. The first and second magnets 2230, 2231, and the voice coil 2228 are the key components of a voice coil motor which applies a force to the actuator assembly 2220 to rotate it about the actuator shaft 2218. Also mounted to the base 2212 is a spindle motor. The spindle motor includes a rotating portion called a spindle hub 2233. In this particular disc drive, the spindle motor is within hub 2233. In FIG. 22, a number of discs 2234 (one or more; four are shown) are attached to the spindle hub 2233 to form disc assembly 2232. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors, which are within the hub 2233 or under the hub.

Figure 23:
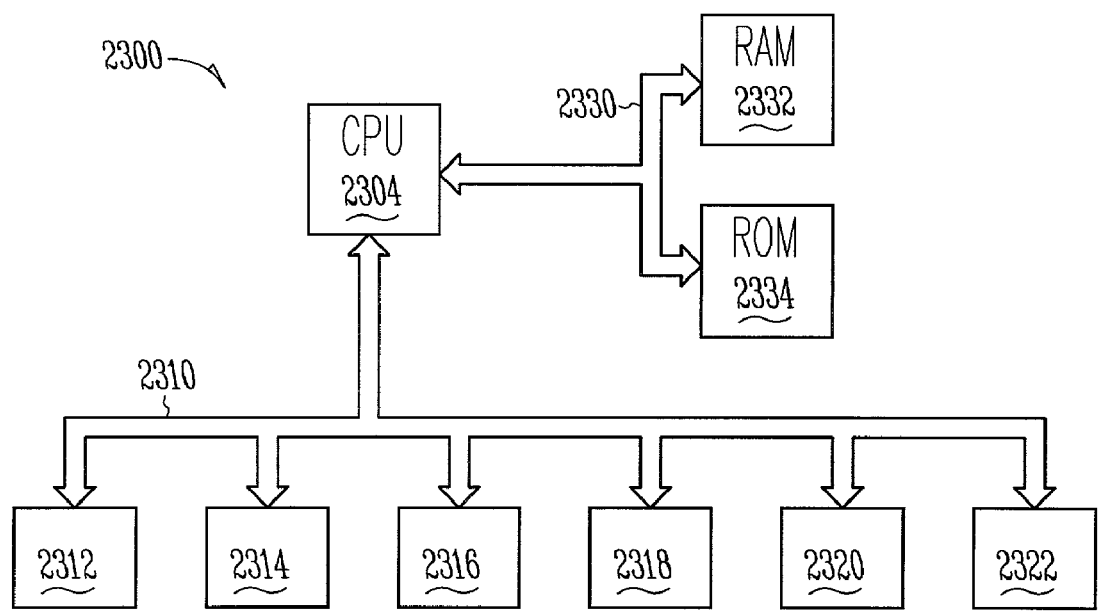
FIG. 23 is a schematic view of an information handling system.

FIG. 23 is a schematic view of an information handling systems 2300. Advantageously, the invention is well-suited for use in an information handling system 2300. The information handling system 2300 may also be called an electronic system or a computer system and includes a central processing unit, a memory and a system bus. The information handling system 2300 includes a central processing unit 2304, a random access memory 2332, and a system bus 2330 for communicatively coupling the central processing unit 2304 and the random access memory 2332. The information handling system 2300 includes a disc drive device. The information handling system 2300 may also include an input/output bus 2310 and several peripheral devices, such as 2312, 2314, 2316, 2318, 2320, and 2322, which may be attached to the input output bus 2310. Peripheral devices may include hard disc drives, magneto optical drives, floppy disc drives, monitors, keyboards and other such peripherals.

CONCLUSION

In conclusion, systems and methods are disclosed through which manage the flow of current to a spindle motor of a mass storage device.

In one aspect of the present invention, a method 600 for controlling a spindle motor of a mass storage device includes directing 610 current to the motor and modulating 610 the current to reduce interference in the interface between a head and a disc of the mass storage device. In varying further embodiments, the modulating step 610 is performed during spin-up or spin-down of the mass storage device.

In a further embodiment of the modulating step 620 that modulates the current in reference to a predetermined profile, the profile represents a relationship between time and quantity of current, and the modulating 620 includes a method 700 that includes monitoring 710 a lapse of time. Method 700 further includes referencing 720 the representation of a quantity of current in the profile, from the lapse of time. Method 700 also includes modulating 730 the current to the motor in reference to the representation of the quantity of current in the profile. In one embodiment, the predetermined profile is a nonlinear predetermined profile that represents a nonlinear relationship between time and quantity of current.

In another embodiment of the modulating step 620 that modulates the current in reference to a predicted occurrence of interference in the interface between a head and a disc of the mass storage device that exceeds a predetermined threshold of interference in the interface between the head and the disc of the mass storage device and the modulating 620 includes a method 800 that includes monitoring 810 a lapse of time. Method 800 also includes comparing 820 the lapse of time to the time of a predicted occurrence of interference in the interface between a head and a disc of the mass storage device that exceeds a predetermined threshold of interference in the interface between a head and a disc of the mass storage device. Method 800 also includes modulating 830 the current in reference to the predicted occurrence.

In still another embodiment of the modulating step 620, the modulating 620 step includes modulating 910 the current in reference to a predetermined profile, wherein the predetermined profile reduces air-bearing instability. In still another embodiment of the modulating step 620, the modulating 620 step includes modulating 1010 the current in reference to a predetermined profile, wherein the predetermined profile reduces takeoff air-bearing instability.

In another aspect of the present invention method 1100 generates a profile of modulated current of a spindle motor of a mass storage device. Method 1100 includes receiving 1110 performance data of the mass storage device. The data includes the quantity of current applied to the spindle motor at a plurality of discrete points in time. The data also includes at least one performance measurement. Method 1100 also includes determining 1120 a portion of the performance data that indicates a performance inadequacy that exceeds a predetermined threshold. Method 1100 also includes generating 1130 the profile in reference to the performance inadequacy and the performance data. In one embodiment of method 1100, the performance measurement is a measurement of air-bearing stability. In one embodiment of method 1100, the performance measurement is a measurement of takeoff air-bearing stability.

In yet another aspect of the present invention, an apparatus for controlling a spindle motor of a mass storage device includes a recording medium 1410, a spindle motor 1430 operably attached to the recording medium 1430 of the mass storage device, and a modulator 1450 that modulates current to the spindle motor 1430 in a manner that avoids anomalies in the performance of the mass storage device thereby reducing wear on a head and the recording medium 1410, and provides efficient use of a limited power available to the mass storage device 1420, the modulator 1450 being operably coupled to the spindle motor. In another embodiment, the apparatus includes a predetermined profile 1460. In one embodiment of the profile 1460, the profile 1460 includes a plurality of representations of quantity of current and a corresponding plurality of times.

One embodiment of the modulator 1450 includes a clock device 1530, wherein the clock device 1530 is a component of a microcontroller of the mass storage device, a time monitor 1510 of a lapse of time 1535, wherein the time monitor 1510 obtains the time 1520 from the clock device 1530, and generates a time lapse 1535 from the time 1520, the time monitor 1510 being operably coupled to the clock device, a profile referencer 1540, wherein the profile reference 1540 references the predetermined profile 1460 using the lapse of time 1535 to extract or receive a representation of a quantity of current 1560 in the profile 1460, the profile referencer 1540 being operably coupled to the time monitor 1510, and a controller 1570 of the current to the spindle motor 1430 in reference to the representation of the quantity of current 1560, the controller 1570 being operably coupled to the profile referencer 1540. In one embodiment, the profile referencer 1540 identifies a particular quantity or level of current 1560 from the lapse of time 1535 as an index into the profile 1550.

In one embodiment of the apparatus the mass storage device is a disc drive.

In still another aspect of the present invention, an apparatus for generating a profile of modulated current of a spindle motor of a mass storage device includes a receiver 1710 of performance data 1720 of the mass storage device, wherein the data 1720 includes a quantity of current applied to the spindle motor at a each of a plurality of discrete points in time, and wherein the data 1720 also includes at least one performance measurement, a determiner 1730 of one or more portions 1740 of the performance data 1720 that indicate a performance inadequacy that exceeds a predetermined threshold or level 1750, wherein the determiner 1730 is operably coupled to the receiver 1710, and a generator 1780 of the profile 1790 in reference to the performance inadequacy 1740 and the performance data 1720, wherein the generator is operably coupled to the determiner 1730.

It is to be understood that the above description is intended to be illustrative, and not restrictive. Many other embodiments will be apparent to those of skill in the art upon previewing the above description. The scope of the invention should, therefore, be determined with reference to the appended claims, along with the full scope of equivalents to which such claims are entitled.

We claim:

1. A method comprising steps of:
   (a) directing current to a motor; and
   (b) modulating the current in reference to a predetermined profile that reduces air bearing instability, and in reference to an occurrence of interference associated with an undesired air-bearing stability in an interface between a head and a surface.

2. The method of claim 1, wherein the motor is associated with a spindle and the surface is a disc, wherein the disc and motor are included in a storage device.

3. The method of claim 2, wherein the modulating step (b) further comprises the step of:
   (b)(i) modulating the current in reference to a predicted occurrence of interference in the interface between the head and the disc of the storage device that exceeds a predetermined threshold of interference in the interface between the head and the disc of the storage device.

4. The method of claim 3, wherein the modulating step (b)(i) further comprises the steps of:
   (b)(i)(1) monitoring a lapse of time;
   (b)(i)(2) comparing the lapse of time to the time of a predicted occurrence of interference in the interface between the head and the disc of the storage device that exceeds a predetermined threshold of interference in the interface between the head and the disc of the storage device; and
   (b)(i)(3) modulating the current in reference to the predicted occurrence.

5. The method of claim 2 wherein the modulating step (b) further comprises the step of:
   (b)(i) modulating the current during spin-up of the storage device.

6. The method of claim 2, wherein the modulating step (b) further comprises the step of:
   (b)(i) modulating the current during spin-down of the storage device.

7. The method of claim 1, wherein the profile represents a relationship between time and quantity of current, and wherein the modulating step further comprises the steps of:
   (b)(1) monitoring a lapse of time;
   (b)(2) referencing the representation of a quantity of current in the profile, from the lapse of time; and
   (b)(3) modulating the current to the motor in reference to the representation of the quantity of current in the profile.

8. The method of claim 1, wherein the predetermined profile reduces takeoff air-bearing instability.

9. The method of claim 1, wherein the modulating step (b) further comprises the step of:
   (b)(i) increasing the current, in reference to the occurrence of interference in the interface between the head and the surface.

10. A method for generating a profile of modulated current of a spindle motor of a mass storage device, the method comprising steps of:
    (a) receiving air-bearing stability performance data of the mass storage device, the data including the quantity of current applied to the spindle motor at a plurality of discrete points in time, and including at least one performance measurement;
    (b) determining a portion of the performance data that indicates a performance inadequacy that exceeds a predetermined threshold; and
    (c) generating the profile in reference to the performance inadequacy and the performance data.

11. The method of claim 10, wherein the air-bearing stability further comprises takeoff air-bearing stability.

12. The method of claim 10, wherein the performance data includes a measurement of a drag and a measurement of speed, and the method further comprises:
    (d) measuring the drag and speed; and
    (e) burning the profile into the firmware of a processor of the mass storage device.

13. A method for dynamically modulating current based on dynamic performance data during operation of a storage device, the method comprising steps of:
    (a) determining interference associated with an undesired air-bearing stability between a head and a storage medium of the storage device, in reference to a performance profile, and in reference to dynamic performance data during operation, the determining step comprising:
       (a)(i) measuring the time per revolution; and
       (a)(ii) comparing the time per revolution to an expected time in the profile;
          wherein not meeting the expected time is an indication of interference; and
    (b) modulating current to control the disc in reference to the interference.

14. A method for dynamically modulating current based on dynamic performance data during operation of a storage device, the method comprising steps of:
    (a) determining interference associated with an undesired air-bearing stability between a head and a storage medium of the storage device, in reference to a performance profile, and in reference to dynamic performance data during operation, the determining step comprising:
       (a)(i) sampling the rate of change of speed; and
       (a)(ii) comparing the rate of change of speed to a last sample; and
    (b) modulating current to control the disc in reference to the interference.

15. The method of claim 14, wherein the sampling step (a)(i) further comprises:
    (a)(i)(1) sampling the rate of change of speed at each revolution.

16. The method of claim 14, wherein the sampling step (a)(i) further comprises:
    (a)(i)(1) sampling the rate of change of speed at multiple revolutions.

17. The method of claim 14, wherein the sampling step (a)(i) further comprises:
    (a)(i)(1) sampling the rate of change of speed at sub-multiple revolutions.

18. An apparatus for controlling a spindle motor of a mass storage device, the apparatus comprising:
    a recording medium;
    a spindle motor operably attached to the recording medium of the mass storage device; and
    a modulator that modulates current to the spindle motor in a manner that avoids anomalies in the performance of the mass storage device thereby reducing wear on a head and the recording medium, the modulator being operably coupled to the spindle motor.

19. The apparatus of claim 18, further comprising:
a predetermined profile, the profile including a plurality of representations of quantity of current and a corresponding plurality of times.

20. The apparatus of claim 19, wherein the modulator further comprises:
- a clock device, wherein the clock device is a component of a microcontroller of the mass storage device;
- a time monitor of a lapse of time, wherein the time monitor obtains the time from the clock device, and generates a time lapse from the time, the time monitor being operably coupled to the clock device;
- a profile referencer, wherein the profile reference references the predetermined profile using the lapse of time to extract or receive a representation of a quantity of current in the profile, the profile referencer operably coupled to the time monitor; and
- a controller of the current to the spindle motor in reference to the representation of the quantity of current, the controller operably coupled to the profile referencer.

21. The apparatus of claim 20, wherein the profile referencer identifies a particular quantity or level of current from the lapse of time as an index into the profile.

22. The apparatus of claim 20, wherein the mass storage device further comprises a disc drive.

23. An apparatus to generate a profile of modulated current of a spindle motor of a mass storage device, comprising:
- a receiver of performance data of the mass storage device, wherein the data includes a quantity of current applied to the spindle motor at each of a plurality of discrete points in time, and wherein the data also includes at least one air-bearing stability performance measurement;
- a determiner of one or more portions of the performance data that indicate a performance inadequacy that exceeds a predetermined threshold or level, wherein the determiner is operably coupled to the receiver, and
- a generator of the profile in reference to the performance inadequacy and the performance data, wherein the generator is operably coupled to the determiner.

* * * * *